# United States Patent Office 2,978,410
Patented Apr. 4, 1961

2,978,410

CORROSION-RESISTANT GREASE

Harry J. Worth, Fullerton, Calif., assignor to Union Oil Company of California, Los Angeles, Calif., a corporation of California No Drawing. Filed Nov. 27, 1957, Ser. No. 699,203

8 Claims. (Cl. 252—18)

This invention relates to a lubricating grease having water resistance and corrosion resistance, making it suitable for use in the lubrication of food processing and canning machinery.

To be suitable for use in canneries, particularly for use on seamers and the like, it is important that a grease be resistant to water, to steam which is used in cleaning the seamer heads, and the like, and must operate satisfactorily in the presence of juices, such as tomato juice, citrus juices, and the like. Not only must the grease withstand the action of these materials, it must prevent corrosion under moist conditions and in the presence of acid fruit juices which are extremely corrosive to metal parts, bearings and the like. Furthermore, due to the washing action of water, steam and juices, it is difficult to maintain a lubricating film and the grease to be used for such purposes must resist such washing actions.

It is an object of this invention therefore to provide a grease which is resistant to and which will lubricate bearings in the presence of water, steam, corrosive fruit juices and the like.

It is another object to provide a grease which is readily applied to bearings, both roller and ball bearings as well as sleeve bearings, to chains and gears and other moving parts in canneries, and which will lubricate these moving parts and protect them from corrosion due to moisture and to cororsive fruit juices.

It is a further object to provide a grease which is shear stable, which has good pumpability, and which has a white color, the latter being one of the requirements of cannery operators.

A grease having all of the above properties and characteristics is prepared using calcium 12-hydroxystearate as the thickening agent, a medium viscosity, light-colored, stable mineral lubricating oil, together with a filler such as zinc oxide, magnesium oxide or mixtures of these oxides, and an anti-corrosion additive which protects the metal parts of cannery machinery against the corrosion effects of moisture, acid fruit juices and the like.

A particularly satisfactory grease is prepared using the following ingredients:

| | Parts by Weight | Percent by Weight |
|---|---|---|
| 12-Hydroxystearic acid | 171 | 6.6 |
| Hydrated lime, Ca(OH)₂ | 25 | 1.0 |
| Zinc oxide | 55 | 2.1 |
| Magnesium oxide | 11 | 0.4 |
| Paratac ª | 11 | 0.4 |
| Agerite Stalite ᵇ | 12 | 0.5 |
| Amine 220 ᶜ | 27.5 | 1.1 |
| 300 Neutral oil | 2,270 | 87.9 |
| | 2,582.5 | 100.00 |

ª A stringiness agent consisting of a high molecular weight polysiobutylene having a Saybolt furol viscosity at 210° F. of 1300, obtainable from Enjay Co.
ᵇ An oxidation inhibitor consisting of a mixture of octylated and styrenated diphenylamines obtainable from R. T. Vanderbilt Co., Inc., 230 Park Avenue, New York.
ᶜ An anti-corrosion agent consisting of 1-hydroxyethyl-2-heptadecenyl glyoxalidine.

In preparing this grease the lime, 12-hydroxystearic acid and approximately 500 parts of the 300 neutral oil is charged to a grease kettle and heated to 220° F. At this point an additional 300 parts of oil is added while stirring and heating is continued to a maximum temperature of about 260° F. for a period of about 3 hours. Following the cooking period an additional 1500 parts of oil is added. After thorough mixing the batch, which will generally be alkaline at this point, is neutralized by the addition of the required amount of 12-hydroxystearic acid. Cooling is then started with continued mixing and the zinc oxide, magnesium oxide, oxidation inhibitor and Amine 220 are added, the Paratac being added after the product is cooled to substantially room temperature. The remainder of the oil is then added.

The grease prepared in the manner described using the above charge is white in color, has a buttery texture, contains 7.1% soap, has an ASTM dropping point of 293° F., and a worked penetration of 290. Its oxidation resistance is good as indicated by a pressure drop in 100 hours of 4 pounds and in 500 hours of 12 pounds in the ASTM D942-50 oxidation test. In the 100,000-stroke worker test it softens only about 8 points.

In preparing the above calcium 12-hydroxystearate grease it is essential that the temperature not be allowed to exceed a maximum of 280° F., since at a temperature of about 290° F. an irreversible separation of soap and oil occurs.

A grease having the desirable characteristics of this invention will contain a thickener, i.e. calcium 12-hydroxystearate, a filler, i.e. either zinc or magnesium oxide or a mixture of these oxides, and a compound which imparts anti-corrosion characteristics to the grease such as the above-described Amine 220. The presence of Paratac or other stringiness agent, and Agerite Stalite or other oxidation inhibitors, is not essential to the production of a satisfactory grease having the properties described hereinabove. However, as is well known in the grease making art, a stringiness agent as described is often added to impart a slight stringiness to the grease and generally an oxidation inhibitor is added which improves the storage stability of the grease.

With respect to the oxidation inhibitor, it is to be pointed out that if such an agent is to be used, and generally it is preferable to use one in order to maintain the stability of the grease in storage, Agerite Stalite is particularly good in that it adds little if any color to the grease and appears to stabilize the grease with respect to color in a manner superior to that obtained by the ordinary oxidation inhibitors employed in grease manufacture. Thus phenyl alphanaphthylamine and phenyl betanaphthylamine which are extensively used as oxidation inhibitors for greases do not appear to protect the white color of the grease as well as the particular oxidation inhibitor described above. However, any of the well known oxidation inhibitors for use in soap thickened oils may be employed in the grease of this invention.

Anti-corrosion agents which are effective in producing the corrosion-resistant greases of this invention are compounds of the general formula

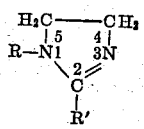

in which R is an alkylol group of 1 to about 12 carbon atoms, preferably 1 to 6 carbon atoms and R' is an alkyl or alkenyl group of about 11 to about 21 carbon atoms. These compounds are known as 1-alkoxy-2-alkyl glyoxalidines or 1-alkoxy-2-alkenyl glyoxalidines. They are prepared by reacting saturated or unsaturated aliphatic acids with hydroxy diamines and heating to effect cyclization by the removal of two molecules of water. The aliphatic acids which are useful in preparing the anti-corrosion agents of this invention include saturated and unsaturated aliphatic acids having from about 12 to about 22 carbon atoms. R' groups resulting from such acids include undecyl, tridecyl, pentadecyl, undecenyl, heptadecyl, heptadecenyl and the like. Acids such as palmitic acid, oleic acid and stearic acid are particularly preferred. Hydroxy diamines useful in preparing the anti-corrosion agents of this invention, have the formula $$RNH \cdot CH_2 \cdot CH_2 \cdot NH_2$$

in which R is a hydroxy alkyl group having from 1 to about 12 carbon atoms, preferably from 1 to about 6 carbon atoms. Such groups or radicals include hydroxy ethyl, hydroxy isopropyl, hydroxy butyl, and like radicals. A compound corresponding to Amine 220 described above, is prepared by reacting oleic acid with a hydroxy diamine corresponding to the formula given above in which R is a hydroxy ethyl group. The preparation of compounds of the type described hereinabove is given in U.S. Patent No. 2,267,965. Moreover, compounds of the same structure but referred to as alkyl alkylol imidazolines are described in U.S. Patent 2,711,394.

The mineral oil described as 300 neutral oil is a solvent-treated, dewaxed western paraffinic distillate mineral oil having a nominal viscosity at 100° F. of approximately 300 seconds Saybolt Universal and a viscosity index (V.I.) of 86. Although other mineral lubricating oils may be used in the preparation of greases according to this invention, an oil of the character described is preferred since it is relatively light in color, has good temperature characteristics, i.e., does not change greatly in viscosity with change in temperature, and has good resistance to oxidation. Neutral oils of the character described having viscosities between about 150 and about 400 seconds Saybolt Universal at 100° F. are suitable for use in preparing the greases of this invention. Although white oils in the viscosity range described are satisfactory in most respects, and will therefore be usable in preparing the described greases, they are generally too costly to employ and are possibly not as oxidation resistant as are the so-called neutral oils.

The filter to be employed is preferably zinc oxide or a mixture of zinc oxide and magnesium oxide. Servicewise, magnesium oxide alone generally gives a grease having the desired characteristics although it does not produce a grease having as white a color as one containing zinc oxide. The use of magnesium oxide is therefore considered less desirable. These materials must be finely powdered. However, commercial grades of each of these materials have been found to be satisfactory. Preferably the powders will be fine enough that 98% will pass a 325-mesh screen. The powdered oxide of zinc and/or magnesium is incorporated in the grease following completion of the saponification and subsequent neutralization of the grease by mixing the powder with the grease in the grease kettle and/or by circulating the grease by means of a pump such as a gear pump from the bottom of the kettle to the top of the kettle with or without screening devices in the circulating line. The powdered oxide may also be incorporated in the grease by milling procedures.

The stringiness agent to be used is preferably a high molecular hydrocarbon polymer. In the above example Paratac was used, this being a polyisobutylene. Other polymers, such as polybutylene may also be employed. These polymers which are useful are homopolymers of low molecular weight monoolefins. Preferably, the polymer will be one having a Saybolt furol viscosity at 210° F. of between about 500 and about 2,000 seconds.

In preparing the grease it is generally desirable to add the stringiness agent after most of the agitation or mixing has been completed.

Although a typical formulation has been given hereinabove, it is obvious that variations in the percentages of the various components of the grease can be made without adversely affecting the properties of the finished product. Thus the percentage of soap may vary from about 5% to about 15% by weight. Preferably, between about 6% and about 10% of the soap will be used. In the composition defined above the total filler amounted to approximately 2.5%. This percentage may vary from about 1.5% to about 4% with ZnO, MgO or mixtures of these two oxides. If zinc oxide alone is to be used, preferably around 1.5% to 3% will be employed. If magnesium oxide alone is to be employed, between about 2% and about 4% is preferably employed. In the case of mixtures of the two, particularly where zinc oxide is in the major proportion, between about 1.5% and 3% by weight suffices. The anti-oxidation agent may vary from 0.1% to about 0.75% of the final grease composition. Generally between 0.2 and 0.5% will be employed. The stringiness agent may also vary from 0.1% to 0.75%, although between about 0.2% and 0.6% will generally be used. The anti-corrosion agent as defined hereinabove will be used in amounts ranging from 0.75% to 2.0%, preferably 1.0% to 1.5%.

To determine the suitability of greases prepared as described herein for use on cannery machinery, and in fact on other machinery operating under moist and corrosive conditions, tests have been made on roller bearings and on actual cannery machinery during use in cannery operations. The bearing test was carried out using Timken tapered roller bearings, cup No. 09196, cone No. 09074, the outside diameter of the cup being 1.938 inches. In the test the bearings were coated and lubricated with 2 grams of the grease, the bearing assembled and spun one minute at 1800 r.p.m. The assembled bearing was then supported on a tapered glass bushing and dipped in either lemon juice or tomato juice. Following the dipping the bearing was supported on the glass bushing and placed in a glass ointment jar in such a manner that the bottom of the bearing assembly was approximately 0.25 inch from the bottom of the jar. Five ml. of distilled water was placed in the bottom of the jar and the jar capped and allowed to stand one week at approximately 77° F. At the end of this period the bearing was examined for ease of turning, then disassembled and washed with naphtha and isopropyl alcohol and examined for corrosion on the rollers and the races.

The full-scale tests made in canneries were made on the bearings in Canco 400 seamers and Canco 601 4L Universal seamers. These seamers are made by American Can Co. Tests were also conducted in Angelus seamers, Models 69P, 29P42, 29P, 50P, of the Angelus Sanitary Can Machine Co., and in other types of equipment. In these tests all of the bearings were lubricated with the grease under test and the time noted when corrosion was sufficient to require replacement of bearings.

The following examples will serve to illustrate the invention.

*Example I*

A grease was prepared using the following ingredients:

| | Parts by weight |
|---|---|
| 12-hydroxystearic acid | 150 |
| Hydrated lime | 22 |
| Zinc oxide | 53 |
| 1-hydroxyethyl-2-heptadecylglyoxalidine | 25 |
| 300 neutral oil | 2000 |
| | 2250 |

The lime, 12-hydroxystearic acid and 440 parts of 300 neutral oil are charged to a grease kettle and heated to 220° F. At this time an additional 260 parts of oil is added and heating continued to a maximum temperature of about 265° F. for a period of about 3 hours. Following this cooking an additional 1300 parts of oil is added and after thorough mixing the batch is neutralized by the addition of the required amount of 12-hydroxystearic acid. Cooling is then started with continued mixing, the zinc oxide and anti-corrosion agent are added and the product cooled to substantially room temperature. The remainder of the oil is then added and mixing continued until the product is homogeneous.

The resulting grease has an ASTM penetration at 77° F. of 290, an ASTM dropping point of 294° F. and contains about 7.2% soap.

Example II

For purposes of comparison with the grease of Example I, a grease which does not contain anti-corrosion agent is prepared from the following ingredients:

| | Parts by weight |
|---|---|
| 12-hydroxystearic acid | 150 |
| Hydrated lime | 22 |
| Zinc oxide | 53 |
| 300 neutral oil | 2000 |
| | 2225 |

The method of preparation is the same as that described in Example I.

Example III

For purposes of comparison with the grease of Example I a grease which contains a stringiness agent and antioxidant but does not contain an anti-corrosion agent is prepared from the following ingredients:

| | Parts by weight |
|---|---|
| 12-hydroxystearic acid | 150 |
| Hydrated lime | 22 |
| Zinc oxide | 53 |
| Paratac | 10 |
| Agerite Stalite | 10 |
| 300 neutral oil | 2000 |

The preparation is carried out in the manner described in Example I, the anti-oxidation agent being added along with the zinc oxide and the Paratac being added after most of the oil and mixing has been completed. This product has an ASTM penetration at 77° F. of 288 and an ASTM dropping point of 295° F.

Example IV

A grease is prepared from the following ingredients:

| | Parts by weight |
|---|---|
| 12-hydroxystearic acid | 150 |
| Hydrated lime | 22 |
| Zinc oxide | 53 |
| Paratac | 10 |
| Agerite Stalite | 11 |
| 1-hydroxyethyl-2-heptadecenyl-glyoxalidine | 25 |
| 300 neutral oil | 2000 |

This grease is 300 neutral oil prepared in the manner described in Example I, the Agerite Stalite being added with the anti-corrosion agent and the Paratac being added following the addition of most of the mineral oil. The resulting grease has an ASTM penetration at 77° F. of 290, an ASTM dropping point of 294° F., and contains about 7.1% soap.

Example V

A grease is prepared from the following ingredients using the procedure set forth in Example IV.

| | Parts by weight |
|---|---|
| 12-hydroxystearic acid | 171 |
| Hydrated lime | 25 |
| Zinc oxide | 50 |
| Magnesium oxide | 16 |
| Paratac | 11 |
| Agerite Stalite | 12 |
| 1-hydroxy decyl-2-heptadecylglyoxalidine | 27.5 |
| 300 neutral oil | 2275 |
| | 2587.5 |

Example VI

Example V is repeated using as anti-corrosion agent 30 parts by weight of 1-hydroxyethyl-2-pentadecenyl glyoxalidine.

Example VII

Example V is repeated using 250 parts by weight of 12-hydroxystearic acid and 36.6 parts by weight of hydrated lime to give a grease containing approximately 10% by weight of soap.

Example VIII

Example V is repeated using 20 parts, 0.78% by weight of 1-hydroxyethyl-2-heptadecenyl glyoxalidine in place of the anticorrosion agent shown in that example.

Example IX

Example V is repeated using 38 parts, 1.46% by weight of 1-hydroxypentyl-2-heptadecyl glyoxalidine in place of the anti-corrosion agent shown in that example.

Example X

A bearing corrosion test as described hereinabove run on each of the greases prepared as described in Examples I to IX, inclusive, gives the results shown in the following table.

| Grease | Corrosion Resistance [a] | |
|---|---|---|
| | Lemon Juice | Tomato Juice |
| Commercial [b] | Poor | Poor. |
| Example I | Good | Good. |
| Example II | Poor | Poor. |
| Example III | Poor | Poor. |
| Example IV | Good | Good. |
| Example V | Good | Good. |
| Example VI | Good | Good. |
| Example VII | Good | Good. |
| Example VIII | Fair | Good. |
| Example IX | Good | Good. |

[a] The ratings are based upon ease of turning of the roller bearing and amount of visible corrosion after 1 week.
[b] A commercial grease being used in cannery service.

Example XI

A grease having the composition set forth hereinabove as an unnumbered example and prepared in the manner described gives good protection in the bearing corrosion test and operates satisfactorily in a cannery. Full scale tests on cannery seamers used for sealing cans of lemon juice or tomato juice indicate that seamers described hereinabove when lubricated with commercial greases require bearing replacements after about one week of operation whereas with the grease of this example bearing replacements are not required until after four to five weeks of use in the same service.

While the invention has been described in relation to specific embodiments, it will be apparent to one skilled in the art that various modifications may be made and equivalents substituted therefor without departing from the spirit and scope of the following claims.

I claim:
1. A corrosion-resistant grease consisting essentially of mineral lubricating oil containing between about 5% and about 15% by weight of calcium 12-hydroxystearate soap, between about 1.5% and about 4% by weight of a metal oxide of the class consisting of zinc oxide, magnesium oxide and mixtures of said oxides, and between about 0.75% and about 2.0% by weight of an anti-corrosion agent of the formula

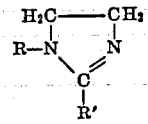

in which R is an alkylol group of 1 to about 12 carbon atoms and R' is a radical of the class consisting of alkyl and alkenyl radicals having between about 11 and about 21 carbon atoms.

2. A grease according to claim 1 containing also between about 0.1% and about 0.75% by weight of a homopolymer of a low molecular weight monoolefin, said homopolymer having a Saybolt furol viscosity at 210° F. of between about 500 and about 2,000 seconds, to impart stringiness to said grease.

3. A grease according to claim 1 containing also between about 0.1% to about 0.75% of an oxidation inhibitor.

4. A grease according to claim 1 in which said anti-corrosion agent is 1-hydroxyethyl-2-heptadecenylglyoxalidine.

5. A corrosion-resistant grease consisting essentially of mineral lubricating oil containing between about 6% and about 10% by weight of calcium 12-hydroxystearate soap, between about 1.5% and 3% by weight of a mixture of zinc oxide and magnesium oxide in which there is a major proportion of zinc oxide and between about 1% and about 2% by weight of an anti-corrosion agent having the formula

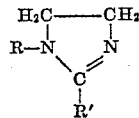

in which R is an alkylol group of 1 to about 12 carbon atoms and R' is a radical of the class consisting of alkyl and alkenyl radicals having between about 11 and about 21 carbon atoms.

6. A grease according to claim 5 containing also between about 0.1% and about 0.75% by weight of a polyisobutylene having a Saybolt furol viscosity at 210° F. of between about 500 and about 2000 seconds, and between about 0.1% and about 0.75% of an oxidation inhibitor.

7. A grease according to claim 6 in which said oxidation inhibitor is a mixture of octylated and styrenated diphenylamines.

8. A corrosion-resistant grease consisting essentially of mineral lubricating oil containing about 7% by weight of calcium 12-hydroxystearate soap, about 2.1% by weight of zinc oxide, about 0.4% by weight of magnesium oxide, about 0.4% by weight of polyisobutylene having a Saybolt furol viscosity at 210° F. of about 1300 seconds, about 0.5% of an oxidation inhibitor consisting of a mixture of octylated and styrenated diphenyl amines and about 1.1% of 1-hydroxyethyl-2-heptadecenyl-glyoxalidine.

References Cited in the file of this patent
UNITED STATES PATENTS

| | | |
|---|---|---|
| 1,449,608 | Judd | Mar. 27, 1923 |
| 2,043,638 | Watts | June 9, 1936 |
| 2,062,346 | Zimmer et al. | Dec. 1, 1936 |
| 2,466,517 | Blair | Apr. 5, 1949 |
| 2,468,163 | Blair | Apr. 26, 1949 |
| 2,599,385 | Gross | June 3, 1952 |
| 2,607,734 | Sproule et al. | Aug. 19, 1952 |
| 2,637,694 | Peterson | May 5, 1953 |
| 2,655,476 | Hughes | Oct. 13, 1953 |
| 2,724,695 | Hughes | Nov. 22, 1955 |
| 2,819,284 | Shen | Jan. 7, 1958 |
| 2,831,812 | Worth | Apr. 22, 1958 |
| 2,898,297 | Schott | Aug. 4, 1959 |

FOREIGN PATENTS

| | | |
|---|---|---|
| 327,097 | Great Britain | Mar. 24, 1930 |

OTHER REFERENCES

Boner: "Manufacture of Greases," Reinhold Pub. Co. (1954), New York, N.Y., pages 111, 366, 779 and 781.